United States Patent [19]

Shiga et al.

[11] Patent Number: 5,521,441

[45] Date of Patent: May 28, 1996

[54] STARTER WITH BAND-SHAPED SEAL MEMBER

[75] Inventors: Tsutomu Shiga, Nukata-gun; Nobuyuki Hayashi, Nagoya; Masanori Ohmi, Anjo; Hideki Ichikawa, Inazawa, all of Japan

[73] Assignee: Nippondenso Co., Ltd., Kariya, Japan

[21] Appl. No.: 381,404

[22] Filed: Jan. 31, 1995

[30] Foreign Application Priority Data

Oct. 5, 1994 [JP] Japan .................................. 6-241140

[51] Int. Cl.$^6$ .............................. F02N 11/08; H02P 9/04
[52] U.S. Cl. .............................................. 290/48; 310/88
[58] Field of Search ............................. 290/27, 38 R, 290/38 A, 38 B, 38 C, 38 D, 38 E, 28, 30 R, 10, 22, 31, 36 A, 36 R, 46, 47, 48; 310/88, 89, 87, 271

[56] References Cited

U.S. PATENT DOCUMENTS

| | | | |
|---|---|---|---|
| 3,419,957 | 1/1969 | Stone | 29/596 |
| 3,735,173 | 5/1973 | Wisniewski | 310/242 |
| 4,626,724 | 12/1986 | Morishita et al. | 310/88 |
| 4,720,648 | 1/1988 | DeVries et al. | 310/89 |
| 4,853,570 | 8/1989 | Isozumi et al. | 310/78 |
| 5,045,736 | 9/1991 | Amano et al. | 310/88 |
| 5,298,824 | 3/1994 | Franz . | |
| 5,311,090 | 5/1994 | Ferlatte | 310/88 |

FOREIGN PATENT DOCUMENTS

| | | |
|---|---|---|
| 3422235 | 12/1985 | Germany . |
| 91/06759 | 5/1991 | WIPO . |

OTHER PUBLICATIONS

Journal of Nippondenso Technical Disclosure No. 75–002, Nov. 1990.

Primary Examiner—Steven L. Stephan
Assistant Examiner—Christopher Cuneo
Attorney, Agent, or Firm—Cushman, Darby & Cushman

[57] ABSTRACT

A starter which assuredly and simply sealed an outer circumference of one engagement portion between a housing and a yoke or the other engagement portion between the yoke and an end frame with a band-shaped seal member. The banded-shaped seal member covers each engagement portion of the yoke, a center plate, the housing, a brush holder, and the end frame. The seal member has a clearance which is placed to correspond to a notched ventilation hole so that the yoke can be opened in the direction of the starter bottom or the ground.

20 Claims, 3 Drawing Sheets

STARTER WITH BAND-SHAPED SEAL MEMBER

CROSS REFERENCE TO RELATED APPLICATION

This application is based upon and claims priority of Japanese Patent Application No. 6-241140 filed Oct. 5, 1994, the content of which is incorporated herein by reference.

BACKGROUND OF THE INVENTION

1. Field of the Invention

The present invention generally relates to a starter having a band-shaped seal member and, more particularly, it relates to a starter for automobiles.

2. Related Art

In some of the conventional starter, such as disclosed in the JOURNAL OF NIPPONDENSO TECHNICAL DISCLOSURE No. 75-002, a heat contraction tube was used to cover one engagement or coupling portion between a yoke and a housing and the other engagement or coupling portion between the yoke and an end frame as a waterproof seal.

However, such a heat contraction tube which is shrinkable and conventionally used is expensive. Furthermore, after the entire starter was assembled, the tube had to be inserted, and heated and contracted in this assembled state. This required increased man-hours to complete the starter.

SUMMARY OF THE INVENTION

It is an object of the present invention, therefore, to obviate the above problem.

It is a further object of the present invention to provide a starter that can reduce the man-hours in production and assure inexpensive waterproofing function.

According to a starter of the present invention, a sealing effect can be achieved just by winding a band-shaped adhesive seal member around the outer circumference of the engagement or coupling portion between a yoke and a housing or between the yoke and an end frame. This also allows the assembly man-hours to be reduced.

Furthermore, the seal member is stuck or adhered to the yoke, and surface treatment of the yoke is not required, thereby reducing costs. The sealing member such as an O-ring used conventionally on the yoke engagement portion can be eliminated, thereby eliminating machining costs and lowering total production cost.

Preferably, with one winding of the band-shaped seal member, a clearance at the end portion is made to correspond to a ventilation hole portion of the yoke, housing or end frame, so the ventilation function is attained thereby.

Alternatively or more preferably, the band-shaped seal member has a hole portion which corresponds to the ventilation hole portion of the yoke, housing or end frame, so the ventilation function is attained thereby.

More preferably, the band-shaped seal member is wound multiple times to overlay, so commercially available seal members can be used.

Still more preferably, if sound-absorbing material is used for the band-shaped seal member, the sound of the starter operation is absorbed and reduced, so a quiet starter can be provided. Furthermore, if a heat insulating material is used, the starter can be protected from heat from a vehicle exhaust heat generated from an exhaust muffler, etc.

Still more preferably, an outer surface of the band-shaped seal member can be used for a nameplate or caution plate, so the number of parts can be reduced.

Still more preferably, by applying the starter to the approximate cylinder portion of a coaxial starter, the band-shaped seal member can be easily mounted thereby improving the mounting efficiency.

DETAILED DESCRIPTION OF THE PREFERRED EMBODIMENTS

The present invention is described in detail hereinunder with reference to the embodiments shown in the accompanying drawings.

Figure 1:
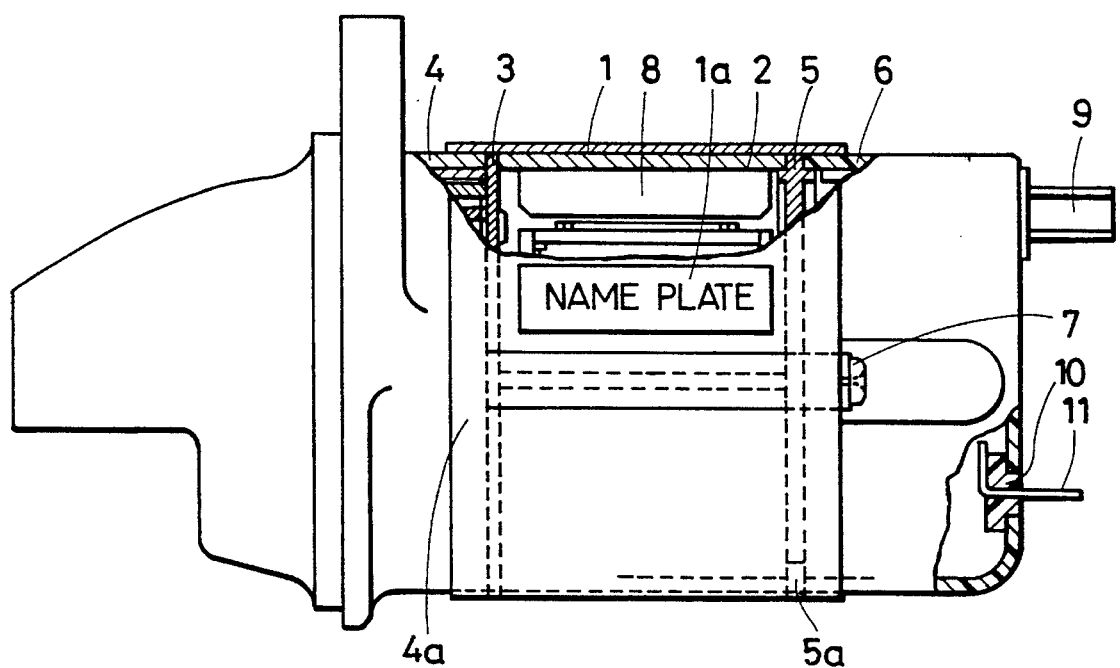
FIG. 1 is a partial cross-sectional view illustrating a starter according to the embodiment of the present invention.
Figure 2:
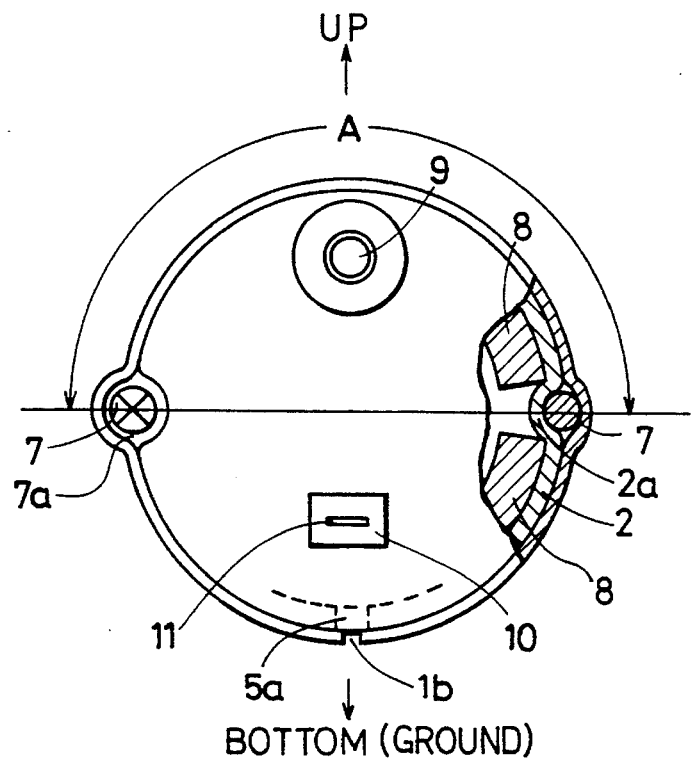
FIG. 2 is a partial cross-sectional view illustrating the rear of the starter shown in FIG. 1.
Figure 3A:
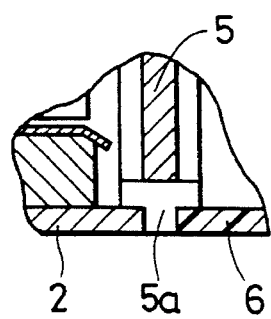
FIGS. 3A and 3B are a cross-sectional view and a plan view of the ventilation hole of the starter shown in FIG. 1.
Figure 3B:
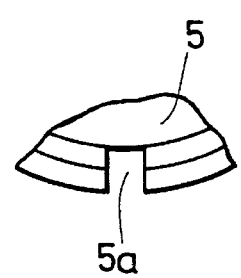

In FIG. 1 showing the first embodiment, a band-shaped seal member 1 is wound on a starter, which is well known and a description thereof is omitted for brevity, and is made of a material such as polyester, vinyl, paper, cloth, synthetic resin film, metal foil such as aluminum foil, stretchy rubber material or stretchy cloth material. Adhesive is applied on the inner circumference of the seal member 1, and a nameplate 1a indicating the manufacturer, part numbers, date of manufacture or cautionary item is printed on the outer surface of the zeal member 1. The seal member 1 covers a cylindrical field yoke 2 with permanent magnets 8, a disk-like center plate 3, a housing 4 encasing a pinion (not illustrated) therein, a disk-like brush holder 5, and an end frame 6 encasing a magnet switch (not illustrated) horizontally or vertically therein and supporting a battery terminal 9 and a switch terminal 11. Especially, the seal member 1 covers two circular engagement or coupling portions, one between the yoke 2 and the housing 4 and the other between the yoke 2 and the end frame 6. This seal member 1 has a clearance 1b between the circumferential ends of the member 1 so that a notched ventilation hole 5a on the brush holder 5 and yoke 2 can be opened in the direction of the starter bottom as illustrated in FIG. 2 and FIGS. 3A and 3B.

The material of the band-shaped seal member 1 in this embodiment is most preferably polyester film.

The surfaces of the field yoke 2, the center plate 3, the housing 4 and the brush holder 5 can be treated with plating or paint, but as they are covered by the band-shaped seal member 1, this surface treatment can be eliminated.

As the end frame 6 is made of resin, the surface does not need to be treated. Even if the end frame 6 is made of metal, the surface does not need to be treated if the frame 6 is covered with the band-shaped seal member 1.

A through bolt 7 is placed on a concave portion 2a formed on the yoke 2 and extends radially inwardly between the field yoke 2 and magnets 8, so the amount that it protrudes from the outer circumference of the field yoke 2 is reduced, thereby making the winding of the band-shaped seal member 1 adhere to the yoke 2 more easily. The band-shaped seal member 1 is stuck along a base 7a of the through bolt 7 and a curved convex portion of a screw base 4a of the housing 4.

Figure 4:
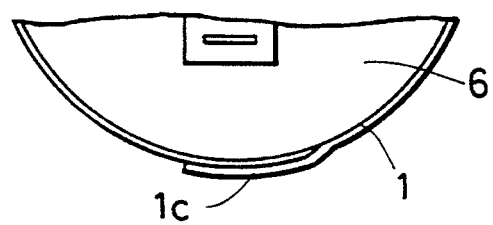
FIG. 4 is a plan view illustrating the end of the band-shaped adhesive seal member winding of the starter shown in FIG. 1.
Figure 5:
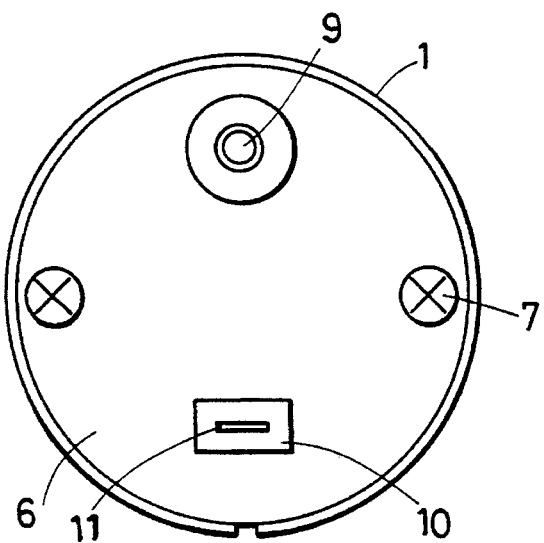
FIG. 5 is a front view illustrating the other embodiments of the present invention.

As shown in FIG. 4, the band-shaped seal member 1 can have a multiple layer portion 1c that covers the joints or coupling portions of the starter where no ventilation holes are formed. Furthermore, as shown in FIG. 5, if the through bolt 7 is placed on the inner diameter side of the field yoke outer diameter, the application of and the sticking properties of the band-shaped seal member can be further improved. The band-shaped seal member 1 can also be wound multiple times to overlay as shown in FIG. 6.

Figure 7:
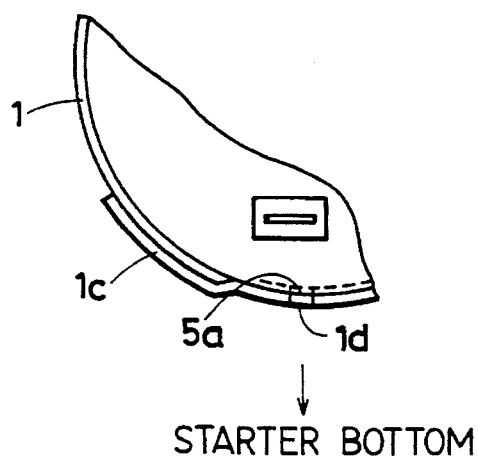
FIG. 7 is a plan view illustrating the band-shaped adhesive member in the other embodiment of the present invention.
Figure 8:
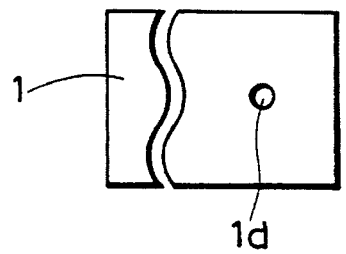
FIG. 8 is a bottom plan view illustrating the ventilation hole in the other embodiment shown in FIG. 7.

As shown in FIG. 8, a hole portion 1d can be formed on the band-shaped seal member 1 so that this hole 1d is made to correspond to the notched ventilation hole 5a formed on the yoke 2 shown in FIG. 7, or to the ventilation hole formed on the housing 4 or end frame 6.

If sound-absorbing material (e.g., foam resin or foam rubber) is used for the band-shaped seal member 1, the operation sound of the starter can be reduced. By using heat insulating material (e.g., aluminum foil, asbestos) for the seal member, the heat to the starter from an engine or exhaust system can be insulated.

Figure 6:
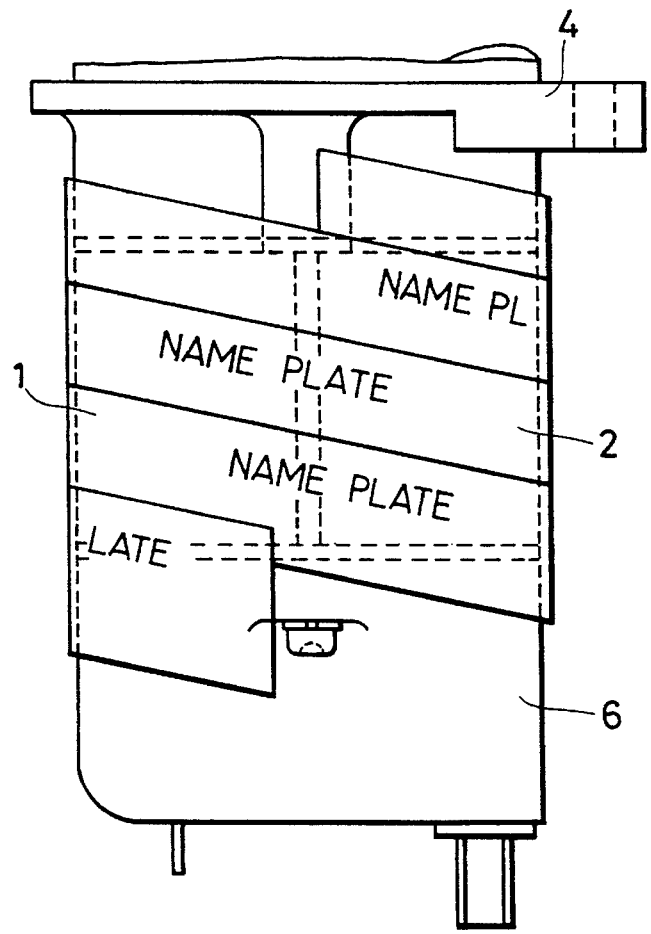
FIG. 6 is a front view illustrating another embodiment in which the band-shaped adhesive seal member is wound multiple times in the third embodiment of the present invention.

If a rubber with a large stretching property or a stretchy cloth is used for the band-shaped seal member 1, the contact properties will further increase, and will be especially suitable for the multiple windings shown in FIG. 6.

For a coaxial type starter wherein a magnet switch for conducting power to the starter motor is placed in the end frame 6 as shown in FIG. 1, the entire structure of the starter will become generally cylindrical, and the band-shaped seal member 1 can be easily mounted on the outer circumference of the starter because no parts are mounted on the yoke, etc.

As shown in FIG. 2, the seal member 1 in the above embodiment covers the outer circumference of the starter by approximately 360 degrees. However, the coupling portion can be covered in the range A that is at least 180 degrees so that the upper half of the starter is covered when mounted on the engine.

In an inertia jump-in type starter where the yoke 2 and end the frame 6 are integrally formed, the seal can be made just between the outer circumference of the coupling between the yoke 2 and the housing 4 with the band-shaped seal member 1.

The explanation of the general operation of the starter will be omitted for brevity but, instead, the seal effect of this invention will be explained.

By sealing the field yoke 2, an outer circumference of the engagement or coupling portion of the yoke 2 and center plate 3, an outer circumference of the engagement or coupling portion of the center plate 3 and housing 4, an outer circumference of the engagement or coupling portion of the yoke 2 and brush holder 5, and an outer circumference of the engagement or coupling portion of the brush holder 5 and motor cover 6 using the abovementioned method, the outer circumference of the starter motor is easily, reliably sealed.

Furthermore, the battery terminal 9 of the end frame 6 is also used as a seal by mold fixing. The space between the switch terminal 11 and the motor cover 6 is sealed by seal 10.

As shown in FIG. 2, with the clearance 1b being placed on the ventilation hole 5a which is opened in the direction of the starter bottom or ground, the ventilation effect of the ventilation hole 5a is not lost.

The present invention has been described with reference to several embodiments. It is to be understood, however, that the present invention is not limited to those embodiments but may be modified in many other ways without departing from the spirit of the invention.

What is claimed is:

1. A starter comprising:

a yoke having magnetic pole means arranged at an inside circumference thereof;

at least one of a housing engaged with one end of said yoke to define a first engagement portion and an end frame engaged with the other end of said yoke to define a second engagement portion, at least one of said yoke, said housing and said end frame having a ventilation hole portion communicating between an inside and an outside thereof; and a band-shaped seal member having first and second end edges and first and second side edges so as to be in one of a tape form and a sheet form, said seal member being wrapped directly on to an outer circumference of at least one of said first engagement portion and said second engagement portion to eliminate an air gap between said seal member and said at least one engagement portion, said band-shaped seal member being provided and wrapped so as to permit continued communication between the inside and the outside through said ventilation hole portion.

2. The starter according to claim 1, wherein said band-shaped seal member includes an adhesive material.

3. The starter according to claim 1, wherein said seal member is wrapped so that said end edges define circumferencial ends of said seal member and so that a clearance is formed between said circumferencial ends of said band-shaped seal member, and wherein said clearance is placed to correspond to said ventilation hole portion of at least one of said yoke, said housing and said end frame.

4. The starter according to claim 3, wherein said ventilation hole is formed on a bottom portion of said yoke.

5. The starter according to claim 1, wherein said band-shaped seal member has a hole portion, and wherein said hole portion is placed to correspond to said ventilation hole portion.

6. The starter according to claim 5, wherein said ventilation hole portion is formed on a bottom portion of said yoke.

7. The starter according to claim 1, wherein said band-shaped seal member is spirally wound so that said side edges overlap.

8. The starter according to claim 1, wherein said seal member includes at least one of a sound-absorbing material and an insulating material.

9. The starter according to claim 1, wherein said band-shaped seal member is also used for at least one of a nameplate and a caution plate.

10. The starter according to claim 1, wherein said end frame encases therein a magnet switch.

11. The starter according to claim 1, wherein the band-shaped seal member is wrapped so as to cover an entire outer surface of said yoke.

12. The starter comprising:

a yoke having magnetic pole means arranged at an inside circumference thereof;

at least one of a housing engaged with one end of said yoke to define a first engagement portion and an end frame engaged with the other end of said yoke to define a second engagement portion;

a band-shaped seal member having first and second end edges and first and second side edges so as to be in one of a tape form and a sheet form, said seal member being wrapped directly on to an outer circumference of at least one of said first engagement portion and said second engagement portion to eliminate an air gap between said seal member and said at least one engagement portion; and wherein said yoke has a concave portion for receiving a screw bolt and wherein said band-shaped seal member is wrapped so as to overlie said bolt.

13. The starter according to claim 12, wherein at least one of said yoke, said housing and said end frame has a ventilation hole portion communicating between an inside and an outside thereof; and wherein said band shaped seal member is provided and wrapped so as to permit continued communication between the inside and the outside through the ventilation hole portion.

14. The starter according to claim 13, wherein said seal member is wrapped so that said end edges define circumferencial ends of said seal member and so that a clearance is formed between said circumferencial ends of said band-shaped seal member, and wherein said clearance is placed to correspond to said ventilation hole portion of at least one of said yoke, said housing and said end frame.

15. The starter according to claim 13, wherein said band-shaped seal member has a hole portion, and wherein said hole portion is placed to correspond to said ventilation hole portion.

16. The starter according to claim 13, wherein said ventilation hole is formed on a bottom portion of said yoke.

17. The starter according to claim 12, wherein said band-shaped seal member is spirally wound so that said side edges overlap.

18. The starter according to claim 12, wherein said seal member includes at least one of a sound-absorbing material and an insulating material.

19. The starter according to claim 12, wherein said band-shaped seal member is also used for at least one of a nameplate and a caution plate.

20. The starter according to claim 12, wherein the band-shaped seal member is wrapped so as to cover an entire outer surface of said yoke.

* * * * *